United States Patent [19]

Goldman et al.

[11] Patent Number: 5,500,451
[45] Date of Patent: Mar. 19, 1996

[54] USE OF POLYGLYCEROL ALIPHATIC ETHER EMULSIFIERS IN MAKING HIGH INTERNAL PHASE EMULSIONS THAT CAN BE POLYMERIZED TO PROVIDE ABSORBENT FOAMS

[75] Inventors: Stephen A. Goldman; Jeffrey J. Scheibel, both of Cincinnati, Ohio

[73] Assignee: The Procter & Gamble Company, Cincinnati, Ohio

[21] Appl. No.: 514,346

[22] Filed: Aug. 9, 1995

Related U.S. Application Data

[63] Continuation of Ser. No. 370,920, Jan. 10, 1995.

[51] Int. Cl.$^6$ ........................................... C08J 9/28
[52] U.S. Cl. ..................... 521/64; 521/61; 521/63; 604/359
[58] Field of Search .................. 521/61, 63, 64

[56] References Cited

U.S. PATENT DOCUMENTS

| | | | |
|---|---|---|---|
| Re. 29,871 | 12/1978 | Papantoniou et al. | 424/64 |
| 3,734,867 | 5/1973 | Will | 260/2.5 R |
| 3,763,056 | 10/1973 | Will | 260/2.5 L |
| 3,932,532 | 1/1976 | Hunter et al. | 260/615 R |
| 3,988,508 | 10/1976 | Lissant | 526/344 |
| 4,093,570 | 6/1978 | Miyake et al. | 260/2.5 B |
| 4,217,344 | 8/1980 | Vanlerberghe et al. | 424/60 |
| 4,275,054 | 6/1981 | Sebag et al. | 424/65 |
| 4,473,611 | 9/1984 | Hag | 428/198 |
| 4,522,953 | 6/1985 | Barby et al. | 521/64 |
| 4,595,537 | 6/1986 | Ochiai et al. | 260/410.6 |
| 4,611,014 | 9/1986 | Jones et al. | 521/146 |
| 4,612,334 | 9/1986 | Jones et al. | 521/146 |
| 4,636,525 | 1/1987 | Ochiai et al. | 514/786 |
| 4,657,556 | 4/1987 | Sebag et al. | 8/405 |
| 4,668,709 | 5/1987 | Jones et al. | 521/146 |
| 4,775,655 | 10/1988 | Edwards et al. | 502/410 |
| 4,788,225 | 11/1988 | Edwards et al. | 521/147 |
| 4,788,345 | 11/1988 | Sebag et al. | 568/623 |
| 4,797,310 | 1/1989 | Barby et al. | 428/71 |
| 4,879,107 | 11/1989 | Vanlerberghe et al. | 424/70 |
| 4,946,670 | 8/1990 | Sebag et al. | 424/47 |
| 4,963,535 | 10/1990 | Sebag et al. | 514/54 |
| 5,021,200 | 6/1991 | Vanlerberghe et al. | 264/4.3 |
| 5,055,228 | 10/1991 | Zabotto et al. | 252/312 |
| 5,118,719 | 6/1992 | Lind | 521/64 |
| 5,124,081 | 6/1992 | Vanlerberghe et al. | 424/450 |
| 5,147,345 | 9/1992 | Young et al. | 604/378 |
| 5,149,720 | 9/1992 | DesMarais et al. | 521/63 |
| 5,149,860 | 9/1992 | Zysman et al. | 560/160 |
| 5,154,854 | 10/1992 | Zabotto et al. | 252/312 |
| 5,171,577 | 12/1992 | Griat et al. | 424/450 |
| 5,189,070 | 2/1993 | Brownscombe et al. | 521/64 |
| 5,198,472 | 3/1993 | DesMarais et al. | 521/63 |
| 5,200,433 | 4/1993 | Beshouri | 521/64 |
| 5,210,104 | 5/1993 | Bass et al. | 521/64 |
| 5,250,576 | 10/1993 | DesMarais et al. | 521/63 |
| 5,252,619 | 10/1993 | Brownscombe et al. | 521/64 |
| 5,260,345 | 11/1993 | DesMarais et al. | 521/148 |
| 5,268,224 | 12/1993 | Des Marais et al. | 521/64 |
| 5,290,820 | 3/1994 | Brownscombe et al. | 521/64 |
| 5,318,554 | 6/1994 | Young et al. | 604/378 |
| 5,331,015 | 7/1994 | Des Marais et al. | 521/64 |
| 5,352,711 | 10/1994 | Des Marais | 521/64 |
| 5,387,207 | 2/1995 | Dyer et al. | 604/369 |

FOREIGN PATENT DOCUMENTS

| | | |
|---|---|---|
| 0299762 | 1/1989 | European Pat. Off. . |
| 1340520 | 9/1963 | France . |
| 1493356 | 11/1977 | United Kingdom . |

OTHER PUBLICATIONS

Structure of High–Internal–Phase–Ratio Emulsions, Lissant, Peace, Wu and Mayhan, pp. 416–423, 1973.
A study of Medium and High Internal Phase Ratio Water/Polymer Emulsions, Lissant, pp. 201–208, 1973.
The Geometry of High–Internal–Phase–Ratio Emulsions, Lissant, pp. 462–468, 1966.

*Primary Examiner*—Morton Foelak
*Attorney, Agent, or Firm*—Eric W. Guttag; Carl J. Roof; E. Kelly Linman

[57] ABSTRACT

A process for preparing high internal phase emulsions (HIPE) that can be polymerized to provide flexible, microporous, open-celled polymeric foam materials capable of absorbing aqueous fluids, especially aqueous body fluids such as urine. The HIPE is prepared using certain polyglycerol aliphatic ether emulsifiers that are less chemically complex and variable in composition than many prior HIPE emulsifiers, have higher levels of the desired interfacially active components, and have lower levels of components (e.g., sludge) that are insoluble or insufficiently soluble in the oil phase used to prepare the HIPE. These polyglycerol aliphatic ether emulsifiers provide HIPE having relatively uniform sized water droplets dispersed in the continuous oil phase.

25 Claims, No Drawings

USE OF POLYGLYCEROL ALIPHATIC ETHER EMULSIFIERS IN MAKING HIGH INTERNAL PHASE EMULSIONS THAT CAN BE POLYMERIZED TO PROVIDE ABSORBENT FOAMS

This is a continuation of application Ser. No. 08/370,920, filed on Jan. 10, 1995.

FIELD OF THE INVENTION

This application relates to a process for making high internal phase emulsions using polyglycerol aliphatic ether emulsifiers. This application particularly relates to high internal phase emulsions using polyglycerol aliphatic ether emulsifiers that can be polymerized to provide flexible, microporous, open-celled polymeric foam materials capable of absorbing aqueous fluids, especially aqueous body fluids such as urine.

BACKGROUND OF THE INVENTION

The development of highly absorbent articles for use as disposable diapers, adult incontinence pads and briefs, and catamenial products such as sanitary napkins, are the subject of substantial commercial interest. A highly desired characteristic for such products is thinness. For example, thinner diapers are less bulky to wear, fit better under clothing, and are less noticeable. They are also more compact in the package, making the diapers easier for the consumer to carry and store. Compactness in packaging also results in reduced distribution costs for the manufacturer and distributor, including less shelf space required in the store per diaper unit.

The ability to provide thinner absorbent articles such as diapers has been contingent on the ability to develop relatively thin absorbent cores or structures that can acquire and store large quantities of discharged body fluids, in particular urine. In this regard, the use of certain particulate absorbent polymers often referred to as "hydrogels," "superabsorbents" or "hydrocolloid" materials has been particularly important. See, for example, U.S. Pat. No. 3,699,103 (Harper et al), issued Jun. 13, 1972, and U.S. Pat. No. 3,770,731 (Harmon), issued Jun. 20, 1972, that disclose the use of such particulate absorbent polymers in absorbent articles. Indeed, the development of thinner diapers has been the direct consequence of thinner absorbent cores that take advantage of the ability of these particulate absorbent polymers to absorb large quantities of discharged aqueous body fluids, typically when used in combination with a fibrous matrix. See, for example, U.S. Pat. No. 4,673,402 (Weisman et al), issued Jun. 16, 1987 and U.S. Pat. No. 4,935,022 (Lash et al), issued Jun. 19, 1990, that disclose dual-layer core structures comprising a fibrous matrix and particulate absorbent polymers useful in fashioning thin, compact, nonbulky diapers.

These particulate absorbent polymers were previously unsurpassed in their ability to retain large volumes of fluids, such as urine. A representative example of such particulate absorbent polymers are lightly crosslinked polyacrylates. Like many of the other absorbent polymers, these lightly crosslinked polyacrylates comprise a multiplicity of anionic (charged) carboxy groups attached to the polymer backbone. It is these charged carboxy groups that enable the polymer to absorb aqueous body fluids as the result of osmotic forces.

Absorbency based on capillary forces is also important in many absorbent articles, including diapers. Capillary forces are notable in various everyday phenomena, as exemplified by a paper towel soaking up spilled liquids. Capillary absorbents can offer superior performance in terms of the rate of fluid acquisition and wicking, i.e. the ability to move aqueous fluid away from the point of initial contact. Indeed, the dual-layer core absorbent structures noted above use the fibrous matrix as the primary capillary transport vehicle to move the initially acquired aqueous body fluid throughout the absorbent core so that it can be absorbed and retained by the particulate absorbent polymer positioned in layers or zones of the core.

Other absorbent materials capable of providing capillary fluid transport are open-celled polymeric foams. Indeed, certain types of polymeric foams have been used in absorbent articles for the purpose of actually imbibing, wicking and/or retaining aqueous body fluids. See, for example, U.S. Pat. No. 3,563,243 (Lindquist), issued Feb. 6, 1971 (absorbent pad for diapers and the like where the primary absorbent is a hydrophilic polyurethane foam sheet); U.S. Pat. No. 4,554,297 (Dabi), issued Nov. 19, 1985 (body fluid absorbing cellular polymers that can be used in diapers or catamenial products); U.S. Pat. No. 4,740,520 (Garvey et al), issued Apr. 26, 1988 (absorbent composite structure such as diapers, feminine care products and the like that contain sponge absorbents made from certain types of super-wicking, crosslinked polyurethane foams).

The use of absorbent foams in absorbent articles such as diapers can be highly desirable. If made appropriately, open-celled hydrophilic polymeric foams can provide features of capillary fluid acquisition, transport and storage required for use in high performance absorbent cores. Absorbent articles containing such foams can possess desirable wet integrity, can provide suitable fit throughout the entire period the article is worn, and can minimize changes in shape during use (e.g., swelling, bunching). In addition, absorbent articles containing such foam structures can be easier to manufacture on a commercial scale. For example, absorbent diaper cores can simply be stamped out of continuous foam sheets and can be designed to have considerably greater integrity and uniformity than absorbent fibrous webs. Many absorbent cores made from such fibrous webs fall apart during use. Such foams can also be molded in any desired shape, or even formed into integral, unitary diapers.

Particularly suitable absorbent foams for absorbent products such as diapers have been made from High Internal Phase Emulsions (hereafter referred to as "HIPE"). See, for example, U.S. Pat. No. 5,260,345 (DesMarais et al), issued Nov. 9, 1993 and U.S. Pat. No. 5,268,224 (DesMarais et al), issued Dec. 7, 1993. These absorbent HIPE foams provide desirable fluid handling properties, including: (a) relatively good wicking and fluid distribution characteristics to transport the imbibed urine or other body fluid away from the initial impingement zone and into the unused balance of the foam structure to allow for subsequent gushes of fluid to be accommodated; and (b) a relatively high storage capacity with a relatively high fluid capacity under load, i.e. under compressive forces. These HIPE absorbent foams are also sufficiently flexible and soft so as to provide a high degree of comfort to the wearer of the absorbent article, and can be made relatively thin until subsequently wetted by the absorbed body fluid.

The nature and characteristics of the HIPE absorbent foams are very much dependent on the type of components and the process conditions used to form the HIPE. This includes the emulsifier used in preparing the HIPE. HIPEs, and especially HIPEs having very high ratios of water phase to oil phase, tend to be unstable. Very slight variations or changes in, for example, monomer content of the oil phase, temperature conditions, shearing conditions, or the degree of agitation involved can cause such emulsions to "break" or to separate to at least some degree into their distinct water and oil phases. Even if stable HIPE can be realized, emulsion processing and subsequent polymerization steps can cause coalescence of the relatively small water droplets formed in the HIPE. This can lead to inconsistencies in the cell size of the resultant foam, thus making them less useful for absorbing aqueous fluids.

The properties of the emulsifier used in making the HIPE can have other important effects on the fluid handling properties and characteristics of the resultant HIPE absorbent foam. The monomers used in making HIPE absorbent foams normally result in polymers that would be hydrophobic in the absence of a hydrophilizing surfactant. Even after the HIPE foam is washed and dewatered, some of the emulsifier typically remains within and on the surface of the foam. If it has the right surfactant properties, this residual emulsifier can hydrophilize this normally hydrophobic foam so as to make it capable of being wetted by, and thus absorbing, aqueous fluids.

Although there have been many emulsifiers that have been used to prepare stable HIPEs, a number of these prior emulsifier systems have significant drawbacks. Some of the problems of these prior emulsifier systems include: (1) chemical complexity and variability in composition; (2) variability in performance; (3) relatively low levels of desired interfacially active components capable of forming and stabilizing the HIPE against coalescence at preferred droplet sizes, water:oil ratios, emulsifier levels, and processing conditions; and (4) high levels of components that are insoluble or insufficiently soluble in the oil phase used to prepare the HIPE. These problems can necessitate the use of higher levels of the emulsifier system, the need for an extra processing step to separate oil-phase insoluble components (e.g., sludge) from the oil phase prior to formation of the HIPE, and/or extensive purification steps to make the emulsifier more active, make the emulsifier less variable, reduce the level of components with insufficient oil-phase solubility, etc. All of this increases the cost and process complexity in making HIPE absorbent foams.

Accordingly, it would be desirable to be able use an emulsifier system that: (1) provides a sufficiently stable HIPE for making absorbent foams; (2) provides a relatively consistent and uniform water droplet size in the HIPE; (3) is less chemically complex and variable in composition; (4) has higher levels of the desired interfacially active components; and (5) has lower levels of components that are insoluble or insufficiently soluble in the oil phase used to form the HIPE. It also would be desirable if the emulsifier system could hydrophilize the resultant HIPE absorbent foams even after washing and dewatering.

DISCLOSURE OF THE INVENTION

The present invention relates to a process for obtaining HIPEs useful in making absorbent foams. This process comprising the steps of forming a water-in-oil emulsion from:

A) an oil phase comprising:
1) from about 65 to about 98% by weight of a monomer component capable of forming a polymer having a Tg of about 35° C. or lower and comprising:

a) from about 30 to about 85% by weight of at least one substantially water-insoluble monofunctional monomer capable of forming an atactic amorphous polymer having a Tg of about 25° C. or lower;
b) from 0 to about 40% by weight of at least one substantially water-insoluble monofunctional comonomer; and
c) from about 5 to about 40% by weight of at least one substantially water-insoluble, polyfunctional crosslinking agent; and 2) from about 2 to about 35% by weight of an emulsifier component which is soluble in the oil phase and which is suitable for forming a stable water-in-oil emulsion, said emulsifier component comprising an emulsifier selected from the group consisting of polyglycerol aliphatic ethers comprising at least about 40% linear diglycerol monoaliphatic ethers and at least about 60% polyglycerol aliphatic ethers having $C_{10}$–$C_{24}$ aliphatic groups; and B) a water phase comprising an aqueous solution containing:
1) from about 0.2 to about 20% by weight of a water-soluble electrolyte; and
2) an effective amount of a polymerization initiator;

C) a volume to weight ratio of water phase to the oil phase in the range of from about 12:1 to about 125:1.

The monomer component in the oil phase of the water-in-oil emulsion can be polymerized and then optionally dewatered to provide the polymeric foam material.

Use of polyglycerol aliphatic ethers in the emulsifier system provides sufficiently stable HIPE for subsequently making polymeric foams, as well as providing HIPE having relatively uniform sized water droplets dispersed in the continuous oil phase. The polyglycerol aliphatic ethers of the present invention are less chemically complex and variable in composition than many prior HIPE emulsifiers, have higher levels of the desired interfacially active components, and have lower levels of undesired components that are insoluble or insufficiently soluble in the oil phase used for forming the HIPE. This makes the polyglycerol aliphatic ether emulsifier systems of the present invention attractive for making HIPEs, and particularly HIPEs that are polymerized to form absorbent foams. For certain polyglycerol aliphatic ethers used in the present invention, especially those having $C_{12}$–$C_{18}$ aliphatic groups, the residual ether can also hydrophilize the resultant HIPE absorbent foam, even after washing and dewatering.

DETAILED DESCRIPTION OF THE INVENTION

I. Process for Preparing HIPE and Polymeric Foams Made Therefrom

A. In General

The process of the present invention provides certain water-in-oil emulsions having a relatively high ratio of water phase to oil phase and are commonly known in the art as "HIPEs. These HIPE are subsequently polymerized according to the present invention to provide polymeric foams that are referred to hereafter as "HIPE foams." The relative amounts of the water and oil phases used to form the HIPE are, among many other parameters, important in determining the structural, mechanical and performance properties of the resulting HIPE foams. In particular, the ratio of water to oil in the emulsion can influence the density, cell size, and capillary suction of the foam, as well as the dimensions of the struts that form the foam. The HIPE of the present invention used to prepare these foams will generally have a volume to weight ratio of the water phase to the oil phase in the range from about 12:1 to about 125:1, more typically from about 20:1 to about 90:1, most typically from about 25:1 to about 75:1.

B. Oil Phase Components

1. Monomer Component

The continuous oil phase of the HIPE comprises monomers that are polymerized to form the solid foam structure. This monomer component is formulated to be capable of forming a copolymer having a glass transition temperature (Tg) of about 35° C. or lower, and typically from about 15° to about 30° C. (The method for determining Tg by Dynamic Mechanical Analysis (DMA) is described hereafter in the TEST METHODS section.) This monomer component includes: (a) at least one monofunctional monomer whose atactic amorphous polymer has a Tg of about 25° C. or lower; (b) optionally a monofunctional comonomer; and (c) at least one polyfunctional crosslinking agent. Selection of particular types and amounts of monofunctional monomer(s) and comonomer(s) and polyfunctional cross-linking agent(s) can be important to the realization of absorbent HIPE foams having the desired combination of structure, mechanical, and fluid handling properties that render such materials suitable for use as absorbents for aqueous fluids.

The monomer component comprises one or more monomers that tend to impart rubber-like properties to the resulting polymeric foam structure. Such monomers can produce high molecular weight (greater than 10,000) atactic amorphous polymers having Tgs of about 25° C. or lower. Monomers of this type include, for example, monoenes such as the ($C_4$–$C_{14}$) alkyl acrylates such as butyl acrylate, hexyl acrylate, octyl acrylate, 2-ethylhexyl acrylate, nonyl acrylate, decyl acrylate, dodecyl (lauryl) acrylate, isodecyl acrylate, tetradecyl acrylate, aryl acrylates and alkaryl acrylates such as benzyl acrylate, nonylphenyl acrylate, the ($C_6$–$C_{16}$) alkyl methacrylates such as hexyl methacrylate, octyl methacrylate, nonyl methacrylate, decyl methacrylate, isodecyl methacrylate, dodecyl (lauryl) methacrylate, tetradecyl methacrylate, acrylamides such as N-octadecyl acrylamide, ($C_4$–$C_{12}$) alkyl styrenes such as p-n-octylstyrene, and polyenes such as isoprene, butadiene, 1,3-hexadiene, 1,3-heptadiene, 1,3-octadiene, 1,3-nonadiene, 1,3-decadiene, 1,3-undecadiene, 1,3-dodecadiene, 2-methyl-1,3-hexadiene, 6-methyl-1,3-heptadiene, 7-methyl-1,3-octadiene, 1,3,7-octatriene, 1,3,9-decatriene, 1,3,6-octatriene, 2,3-dimethyl-1,3-butadiene, 2-amyl-1,3-butadiene, 2-methyl-1,3-pentadiene, 2,3-dimethyl-1,3-pentadiene, 2-methyl-3-ethyl-1,3-pentadiene, 2-methyl-3-propyl-1,3-pentadiene, 2,6-dimethyl-1,3,7-octatriene, 2,7-dimethyl-1,3,7-octatriene, 2,6-dimethyl-1,3,6-octatriene, 2,7-dimethyl-1,3,6-octatriene, 7-methyl-3-methylene-1,6-octadiene (myrcene), 2,6-dimethyl-1,5,7-octatriene (ocimene), 1-methyl-2-vinyl- 4,6-heptadieny-3,8-nonadienoate, 5-methyl-1,3,6oheptatriene, 2-ethylbutadiene, and mixtures of these monomers. Of these monomers, isodecyl acrylate, n-dodecyl acrylate and 2-ethylhexyl acrylate are the most preferred. The monomer will generally comprise 30 to about 85%, more preferably from about 50 to about 70%, by weight of the monomer component.

The monomer component utilized in the oil phase of the HIPEs can also optionally comprise one or more comonomers that are typically included to modify the Tg properties of the resulting polymeric foam structure, its modulus (strength), and its toughness. These monofunctional comonomer types can include styrene-based comonomers (e.g., styrene and ethyl styrene) or other monomer types such as methyl methacrylate where the related homopolymer is well known as exemplifying toughness. Of these comonomers, styrene, ethyl styrene, and mixtures thereof are particularly preferred for imparting toughness to the resulting polymeric foam structure. These comonomers can comprise up to about 40% of the monomer component and will normally comprise from about 5 to about 40%, preferably from about 10 to about 35%, most preferably from about 15 about 30%, by weight of the monomer component.

The monomer component also includes one or more polyfunctional crosslinking agents. The inclusion of these crosslinking agents tends to increase the Tg of the resultant polymeric foam as well as its strength with a resultant loss of flexibility and resilience. Suitable crosslinking agents include any of those that can be employed in crosslinking rubbery diene monomers, such as divinylbenzenes, divinyltoluenes, divinylxylenes, divinylnaphthalenes divinylalkylbenzenes, divinylphenanthrenes, trivinylbenzenes, divinylbiphenyls, divinyldiphenylmethanes, divinylbenzyls, divinylphenylethers, divinyldiphenylsulfides, divinylfurans, divinylsulfone, divinylsulfide, divinyldimethylsilane, 1,1'-divinylferrocene, 2-vinylbutadiene, di-, tri-, tetra-, penta-or higher (meth)acrylates and di-, tri-, tetra-, penta- or higher (meth)acrylamides, including ethylene glycol dimethacrylate, neopentyl glycol dimethacrylate, 1,3-butanediol dimethacrylate, diethylene glycol dimethacrylate, hydroquinone dimethacrylate, catechol dimethacrylate, resorcinol dimethacrylate, triethylene glycol dimethacrylate, polyethylene glycol dimethacrylate; trimethylolpropane trimethacrylate, pentaerythritol tetramethacrylate, 1,4-butanediol dimethacrylate, 1,6-hexanediol diacrylate, 1,4-butanediol diacrylate, tetramethylene diacrylate, trimethyolpropane triacrylate, pentaerythritol tetraacrylate, N-methylolacrylamide, N-methylolmethacrylamide, 1,2-ethylene bisacrylamide, 1,4-butane bisacrylamide, and the like.

The preferred polyfunctional crosslinking agents include divinylbenzene, ethylene glycol dimethacrylate, diethylene glycol dimethacrylate, 1,6-hexanediol diacrylate, 2-butenediol dimethacrylate, ethylene glycol diacrylate, trimethylolpropane triacrylate and trimethacrylate, and mixtures thereof. Divinylbenzene is typically available as a mixture with ethyl styrene in proportions of about 55:45. These proportions can be modified so as to enrich the oil phase with one or the other component. Generally, it is advantageous to enrich the mixture with the ethyl styrene component while simultaneously omitting inclusion of styrene from the monomer blend. The preferred ratio of divinylbenzene to ethyl styrene is from about 30:70 to 55:45, most preferably from about 35:65 to about 45:55. The inclusion of higher levels of ethyl styrene imparts the required toughness without increasing the Tg of the resulting copolymer to the degree that styrene does. The cross-linking agent can generally be included in the oil phase of the HIPE in an amount of from about 5 to about 40%, more preferably from about 10 to about 30%, most preferably from about 15 to about 25%, by weight of the monomer component (100% basis).

The major portion of the oil phase of the HIPEs will comprise the aforementioned monomers, comonomers and crosslinking agents. It is essential that these monomers, comonomers and crosslinking agents be substantially water-insoluble so that they are primarily soluble in the oil phase and not the water phase. Use of such substantially water-insoluble monomers ensures that HIPE of appropriate characteristics and stability will be realized.

It is, of course, highly preferred that the monomers, comonomers and crosslinking agents used herein be of the type such that the resulting polymeric foam is suitably non-toxic and appropriately chemically stable. These monomers, comonomers and cross-linking agents should preferably have little or no toxicity if present at very low residual concentrations during post-polymerization foam processing and/or use.

2. Emulsifier Component

Another essential component of the oil phase is an emulsifier that permits the formation of stable HIPEs. HIPEs are not always stable, particularly when subjected to higher temperature conditions to effect polymerization and curing. As the HIPE destabilizes, the water droplets present in it can coalesce to form much larger water droplets. Indeed, during polymerization and curing of the HIPE, there is essentially a race between solidification of the foam structure, and coalescence of the water droplets. An appropriate balance has to be struck such that coalescence of the water droplets is reduced, yet polymerization and curing of the foam structure can be carried out within a reasonable time. (While some coalescence can be tolerated if the remaining water droplets are very small in size, such nonuniform cell sizes in the resulting foam can adversely affect the fluid transport properties of the foam, especially its wicking rate.) Accordingly, the emulsifier desirably provides relatively uniform and homogeneous dispersion of water droplets in the oil phase.

It has been surprisingly found that certain polyglycerol aliphatic ethers are particularly suitable as emulsifiers for HIPE This is due to their ability to provide sufficiently stable HIPEs where the water droplets are uniformly and homogeneously dispersed in the oil phase. Certain of these polyglycerol aliphatic ethers are also desirable for their ability to perform additional functions, including hydrophilizing the resultant HIPE foam. The resulting polymeric foam is typically washed and dewatered to remove most of the water and other residual water-soluble components. Residual polyglycerol aliphatic ether emulsifier that is not removed by this dewatering and/or washing, if sufficiently hydrophilic, can render the otherwise hydrophobic foam wettable so as to be able to absorb aqueous fluids.

The polyglycerol aliphatic ethers suitable as emulsifiers in HIPE according to the present invention are usually characterized by high levels of linear (i.e., acyclic) diglycerol monoaliphatic ethers (i.e., the ethers comprise high levels of diglycerol moieties with one aliphatic group) and reduced levels of other polyglycerol ethers such as triglycerol monoaliphatic ethers, tetraglycerol monoaliphatic ethers, higher (e.g., pentaglycerol) polyglycerol monoaliphatic ethers, triglycerol dialiphatic ethers, tetraglycerol trialiphatic ethers and higher polyglycerol polyaliphatic ethers. It is especially desirable to minimize the level of combined triglycerol monoaliphatic ethers, tetraglycerol monoaliphatic ethers, and higher polyglycerol monoaliphatic ethers because it is believed these species are detrimental to the formation of suitable HIPEs. Suitable polyglycerol aliphatic ethers usually comprise (weight basis) at least about 40% (typical range of from about 40 to about 90%) linear diglycerol monoaliphatic ethers, and no more than about 60% (typical range of from about 10 to about 60%) other polyglycerol ethers. Preferably, these polyglycerol aliphatic ethers comprise at least about 50%, more preferably at least about 70%, linear diglycerol monoaliphatic ethers.

Polyglycerol aliphatic ethers useful as emulsifiers are also characterized by high levels of combined $C_{10}$–$C_{24}$ aliphatic groups, particularly high levels of combined $C_{12}$–$C_{14}$ linear saturated aliphatic (alkyl) groups (e.g., lauryl and myristyl), combined $C_{16}$–$C_{24}$ branched saturated chain aliphatic (alkyl) groups (e.g., isostearyl, 2-octyldodecyl, and 2-decyltetradecyl), combined $C_{16}$–$C_{22}$ linear unsaturated aliphatic (alkenyl) groups (e.g., oleyl), and combinations thereof. Suitable polyglycerol aliphatic ethers for use in the present invention will comprise at least about 60% ( typical range of from about 60 to about 95%), preferably at least about 80%, most preferably at least about 90% polyglycerol aliphatic ethers having $C_{10}$–$C_{24}$ aliphatic groups.

Polyglycerol aliphatic ethers useful in the present invention as emulsifiers are also usually characterized as imparting a minimum oil phase/water phase interfacial tension (IFT), where the oil phase contains monomers used in the HIPE and the water phase contains calcium chloride. Suitable polyglycerol aliphatic ethers emulsifiers usually impart a minimum oil/water IFT of at least about 0.06 dyne/cm, with a typical range of from about 0.06 to about 10 dyne/cm. Especially preferred polyglycerol aliphatic ethers impart a minimum oil phase/water phase IFT of at least about 0.3 dyne/cm, with a typical range of from about 0.3 to about 8 dyne/cm. A method for measuring the minimum IFT of these polyglycerol aliphatic ethers is described in copending U.S. application Ser. No. 989,270 (Dyer et al), filed Dec. 11, 1992 (herein incorporated by reference).

Polyglycerol aliphatic ethers useful in the present invention as emulsifiers can be prepared by methods well known in the art. See, for example, Sagitani, Y. Hayashi, and M. Ochiai, *J. Am. Oil Chem Soc.*, 66, 146 (1989) and U.S. Pat. No. 4,465,866 (Takaishi et al), issued Aug. 14, 1984, which are incorporated by reference and which describe methods for preparing polyglycerol aliphatic ethers having relatively high levels of linear diglycerol monoaliphatic ethers. As disclosed in Sagitani et al., a diglycerol monoalkyl ether, such as dodecyl diglycerol ether, can be prepared by reacting dodecyl glycidyl ether with sodium glycerate under a nitrogen atmosphere. As disclosed in Takaishi et al, polyglycerol ethers can be prepared by reacting, in the presence of an acid or basic catalyst, an alkyl (or alkenyl) glycidyl ether with an acetal or ketal derivative of glycerol in order to obtain a 1,3-dioxolane, that is then subjected to hydrolysis. These polyglycerol ethers can also be prepared by: (a) the reaction of the linear dimer of glycerol with an alkali to form an alkali metal alcoholate that is then reacted with any alkyl halide, or (b) the reaction of an alcohol with a cyclic compound of the 1,3-dioxolane type with hydrolysis of the resultant addition product. See Takaishi et al where reference is made to *Journal f. Prakt. Chemie, Band* 316 (1974), pp. 325–336.

The aliphatic glycidyl ethers useful in the Takaishi et al and Sagitani et al. processes can be prepared by methods well known in the art. Typical reaction conditions for preparing aliphatic glycidyl ethers from the corresponding aliphatic alcohol are as follows: An approximately stoichiometric quantity (relative to the alcohol) of epichlorohydrin is slowly added to a stirred mixture of the alcohol and stannic chloride under a nitrogen atmosphere and reacted with stirring for about 6 hours at about 65° C. An approximately stoichiometric quantity of sodium hydroxide in a concentrated aqueous solution is then added and the mixture is reacted for about 6 hours at about 65° C. After separating the aqueous layer, the resultant organic layer is water washed, heated to about 95° C. and sparged with nitrogen to dry. The crude product is distilled under vacuum to yield the aliphatic glycidyl ether.

Typical reaction conditions for preparing suitable aliphatic polyglycerol ether emulsifiers from the corresponding aliphatic glycidyl ethers are as follows: Sodium methoxide and glycerol are reacted together at about 130° C. under a nitrogen atmosphere. The reaction product is heated under nitrogen to about 180°–185° C. and the aliphatic glycidyl ether is added dropwise. The resultant mixture is reacted with stirring at about 180°–190° C. and then cooled to effect a separation of a glycerol rich bottom layer from the upper product layer. After removing the bottom layer, the top layer is optionally diluted with methanol, neutralized with carbon dioxide (powdered dry ice), bleached with charcoal and filtered through a bed of celite, with the excess methanol removed using a rotary evaporator. A volatile fraction is removed by vacuum distillation, yielding the polyglycerol aliphatic ether product. The aliphatic polyglycerol ether product is optionally further processed using filtration, extraction, and distillation procedures.

The composition of the polyglycerol aliphatic ethers can be determined by the use of small-molecule gel permeation chromatography with refractive index detection. The ethers are separated into classes, e.g. diglycerol monoaliphatic ethers, triglycerol dialiphatic ethers, etc. Peak identities are established by ion-spray mass spectrometry of collected fractions. The relative distribution is calculated by assuming equal response factors for all polyglycerol aliphatic ether species.

3. Oil Phase Composition

The oil phase used to form the HIPE will generally comprise from about 65 to about 98% by weight monomer component and from about 2 to about 35% by weight emulsifier component. Preferably, the oil phase will comprise from about 80 to about 97% by weight monomer component and from about 3 to about 20% by weight emulsifier component. Preferably, the oil phase will comprise from about 90 to about 97% by weight monomer component and from about 3 to about 10% by weight emulsifier component. The oil phase also can contain other optional components.

In addition to the monomer and emulsifier components, the oil phase can contain other optional components. One such optional component is an oil soluble polymerization initiator of the general type well known to those skilled in the art, such as described in U.S. Pat. No. 5,290,820 (Bass et al), issued Mar. 1, 1994, which is incorporated by reference. Another possible optional component is a substantially water insoluble solvent for the monomer and emulsifier components. Use of such a solvent is not preferred, but if employed will generally comprise no more than about 10% by weight of the oil phase.

A preferred optional component is an antioxidant such as a Hindered Amine Light Stabilizer (HALS) such as bis-(1,2,2,5,5-pentamethylpiperidinyl) sebacate (Tinuvin 765) or a Hindered Phenolic Stabilizer (HPS) such as Irganox 1076 and t-butylhydroxyquinone. Another preferred optional component is a plasticizer such as dioctyl azelate, dioctyl sebacate or dioctyl adipate. Other optional components include fillers, colorants, fluorescent agents, opacifying agents, chain transfer agents, dissolved polymers, and the like.

C. Water Phase Components

The discontinuous water internal phase of the HIPE is generally an aqueous solution containing one or more dissolved components. One essential dissolved component of the water phase is a water-soluble electrolyte. The dissolved electrolyte minimizes the tendency of monomers, comonomers, and crosslinkers that are primarily oil soluble to also dissolve in the water phase. This, in turn, is believed to minimize the extent to which polymeric material fills the cell windows at the oil/water interfaces formed by the water phase droplets during polymerization. Thus, the presence of electrolyte and the resulting ionic strength of the water phase is believed to determine whether and to what degree the resulting preferred HIPE foams can be open-celled.

Any electrolyte capable of imparting ionic strength to the water phase can be used. Preferred electrolytes are mono-, di-, or trivalent inorganic salts such as the water-soluble halides, e.g., chlorides, nitrates and sulfates of alkali metals and alkaline earth metals. Examples include sodium chloride, calcium chloride, sodium sulfate and magnesium sulfate. Calcium chloride is the most preferred for use in the present invention. Generally the electrolyte will be utilized in the water phase of the HIPE in a concentration in the range of from about 0.2 to about 20% by weight of the water phase. More preferably, the electrolyte will comprise from about 1 to about 10% by weight of the water phase.

The HIPE will also typically contain a polymerization initiator. Such an initiator component is generally added to the water phase of the HIPE and can be any conventional water-soluble free radical initiator. These include peroxygen compounds such as sodium, potassium and ammonium persulfates, hydrogen peroxide, sodium peracetate, sodium percarbonate and the like. Conventional redox initiator systems can also be used. Such systems are formed by combining the foregoing peroxygen compounds with reducing agents such as sodium bisulfite, L-ascorbic acid or ferrous salts.

The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase.

D. Hydrophilizing Surfactants and Hydratable Salts

The polymer forming the HIPE foam structure will preferably be substantially free of polar functional groups. This means the polymeric foam will be relatively hydrophobic in character. These hydrophobic foams can find utility where the absorption of hydrophobic fluids is desired. Uses of this sort include those where an oily component is mixed with water and it is desired to separate and isolate the oily component, such as in the case of oil spills.

When these foams are to be used as absorbents for aqueous fluids such as juice spills, milk, and the like and/or bodily fluids such as urine and/or menses, they generally require further treatment to render the foam relatively more hydrophilic. Hydrophilization of the foam, if necessary, can generally be accomplished by treating the HIPE foam with a hydrophilizing surfactant in a manner described more fully hereafter.

These hydrophilizing surfactants can be any material that enhances the water wettability of the polymeric foam surface. They are well known in the art, and can include a variety of surfactants, preferably of the nonionic type. They will generally be liquid form, and can be dissolved or dispersed in a hydrophilizing solution that is applied to the HIPE foam surface. In this manner, hydrophilizing surfactants can be adsorbed by the preferred HIPE foams in amounts suitable for rendering the surfaces thereof substantially hydrophilic, but without altering the desired flexibility and compression deflection characteristics of the foam. In preferred foams, the hydrophilizing surfactant is incorporated such that residual amounts of the agent that remain in the foam structure are in the range from about 0.5 to about 10%, preferably from about 0.5 to about 6%, by weight of the foam.

Suitable hydrophilizing surfactants can include sorbitan laurates (SPAN® 20), as well certain preferred polyglycerol aliphatic ethers previously described that have straight chain $C_{12}$–$C_{18}$ aliphatic groups (e.g., lauryl, myristyl or oleyl groups). Such hydrophilizing surfactants, especially these polyglycerol aliphatic ethers, can be incorporated into the foam during HIPE formation and polymerization, or can be incorporated by treatment of the polymeric foam with a solution or suspension of the surfactant in a suitable carrier or solvent.

Another material that typically needs to be incorporated with these surfactants into the HIPE foam structure is a hydratable, and preferably hygroscopic or deliquescent, water soluble inorganic salt, especially if the foam is to remain in a relatively thin (collapsed) state after drying. Such salts include, for example, toxicologically acceptable alkaline earth metal salts. Salts of this type and their use with oil-soluble surfactants as the foam hydrophilizing surfactant is described in greater detail in U.S. Pat. No. 5,352,711 (DesMarais), issued Oct. 4, 1994, the disclosure of which is incorporated by reference. Preferred salts of this type include the calcium halides such as calcium chloride that, as previously noted, can also be employed as the water phase electrolyte in the HIPE.

Hydratable inorganic salts can easily be incorporated by treating the foams with aqueous solutions of such salts. These salt solutions can generally be used to treat the foams after completion of, or as part of, the process of removing the residual water phase from the just-polymerized foams. Treatment of foams with such solutions preferably deposits hydratable inorganic salts such as calcium chloride in residual amounts of at least about 0.1% by weight of the foam, and typically in the range of from about 0.1 to about 12% by weight of the foam.

Treatment of these relatively hydrophobic foams with hydrophilizing surfactants (with or without hydratable salts) will typically be carried out to the extent necessary to impart suitable hydrophilicity to the foam. Some foams of the preferred HIPE type, however, are suitably hydrophilic as prepared, and can have incorporated therein sufficient amounts of hydratable salts, thus requiting no additional treatment with hydrophilizing surfactants or hydratable salts. In particular, such preferred HIPE foams include those where certain oil phase emulsifiers previously described and calcium chloride are used in the HIPE. In those instances, the internal polymerized foam surfaces will be suitably hydrophilic, and will include residual water-phase liquid containing or depositing sufficient amounts of calcium chloride, even after the polymeric foams have been dewatered.

E. Processing Conditions for Obtaining HIPE Foams

Foam preparation typically involves the steps of: 1) forming a stable high internal phase emulsion (HIPE); 2) polymerizing/curing this stable emulsion under conditions suitable for forming a solid polymeric foam structure; 3) optionally washing the solid polymeric foam structure to remove the original residual water phase from the polymeric foam structure and, if necessary, treating the polymeric foam structure with a hydrophilizing surfactant and/or hydratable salt to deposit any needed hydrophilizing surfactant/hydratable salt, and 4) thereafter dewatering this polymeric foam structure.

1. Formation of HIPE

The HIPE is formed by combining the oil and water phase components in the previously specified ratios. The oil phase will typically contain the requisite monomers, comonomers, crosslinkers, and emulsifiers, as well as optional components such as plasticizers, antioxidants, flame retardants, and chain transfer agents. The water phase will typically contain electrolytes and polymerization initiators.

The HIPE can be formed from the combined oil and water phases by subjecting these combined phases to shear agitation. Shear agitation is generally applied to the extent and for a time period necessary to form a stable emulsion. Such a process can be conducted in either batchwise or continuous fashion and is generally carried out under conditions suitable for forming an emulsion where the water phase droplets are dispersed to such an extent that the resulting polymeric foam will have the requisite structural characteristics. Emulsification of the oil and water phase combination will frequently involve the use of a mixing or agitation device such as a pin impeller.

One preferred method of forming HIPE involves a continuous process that combines and emulsifies the requisite oil and water phases. In such a process, a liquid stream comprising the oil phase is formed. Concurrently, a separate liquid stream comprising the water phase is also formed. The two separate streams are then combined in a suitable mixing chamber or zone such that the requisite water to oil phase weight ratios previously specified are achieved.

In the mixing chamber or zone, the combined streams are generally subjected to shear agitation provided, for example, by a pin impeller of suitable configuration and dimensions. Shear will typically be applied the combined oil/water phase stream at an appropriate rate. Once formed, the stable liquid HIPE can then be withdrawn from the mixing chamber or zone. This preferred method for forming HIPEs via a continuous process is described in greater detail in U.S. Pat. No. 5,149,720 (DesMarais et al), issued Sep. 22, 1992, which is incorporated by reference. See also copending U.S. application Ser. No. 08/370,694 (Thomas A. DesMarais), filed Jan. 10, 1995, (herein incorporated by reference), which describes an improved continuous process having a recirculation loop for the HIPE.

2. Polymerization/Curing of the HIPE

The HIPE formed will generally be collected or poured in a suitable reaction vessel, container or region to be polymerized or cured. In one embodiment, the reaction vessel comprises a tub constructed of polyethylene from which the eventually polymerized/cured solid foam material can be easily removed for further processing after polymerization/curing has been carried out to the extent desired. The temperature at which the HIPE is poured into the vessel is preferably approximately the same as the polymerization/curing temperature.

Suitable polymerization/curing conditions will vary depending upon the monomer and other makeup of the oil and water phases of the emulsion (especially the emulsifier systems used), and the type and amounts of polymerization initiators used. Frequently, however, suitable polymerization/curing conditions will involve maintaining the HIPE at elevated temperatures above about 30° C., more preferably above about 35° C., for a time period ranging from about 2 to about 64 hours, more preferably from about 4 to about 48 hours. The HIPE can also be cured in stages such as described in U.S. Pat. No. 5,189,070 (Brownscombe et al), issued Feb. 23, 1993, which is herein incorporated by reference.

A porous water-filled open-celled HIPE foam is typically obtained after polymerization/curing in a reaction vessel, such as a tub. This polymerized HIPE foam is typically cut or sliced into a sheet-like form. Sheets of polymerized HIPE foam are easier to process during subsequent treating/washing and dewatering steps, as well as to prepare the HIPE foam for use in absorbent articles. The polymerized HIPE foam is typically cut/sliced to provide a cut caliper in the range of from about 0.08 to about 2.5 cm. During subsequent dewatering, this can lead to collapsed HIPE foams having a thickness of from about 10 to about 17% of this cut thickness.

3. Treating/Washing HIPE Foam

The solid polymerized HIPE foam formed will generally be filled with residual water phase material used to prepare the HIPE. This residual water phase material (generally an aqueous solution of electrolyte, residual emulsifier, and polymerization initiator) should be at least partially removed prior to further processing and use of the foam. Removal of this original water phase material will usually be carried out by compressing the foam structure to squeeze out residual liquid and/or by washing the foam structure with water or other aqueous washing solutions. Frequently several compressing and washing steps, e.g., from 2 to 4 cycles, can be used.

After the original water phase material has been removed to the extent required, the HIPE foam, if needed, can be treated, e.g., by continued washing, with an aqueous solution of a suitable hydrophilizing surfactant and/or hydratable salt. Hydrophilizing surfactants and hydratable salts that can be employed have been previously described and include sorbitan laurate (e.g., SPAN 20) and polyglycerol aliphatic ethers having $C_{12}$–$C_{18}$ aliphatic groups and calcium chloride. As noted, treatment of the HIPE foam with the hydrophilizing surfactant/hydratable salt solution continues, if necessary, until the desired amount of hydrophilizing surfactant/hydratable salt has been incorporated and until the foam exhibits the desired adhesion tension value for any test liquid of choice.

4. Foam Dewatering

After the HIPE foam has been treated/washed, it will generally be dewatered. Dewatering can be achieved by compressing the foam to squeeze out residual water, by subjecting the foam, or the water therein, to of from about 60° to about 200° C., or to microwave treatment, by vacuum dewatering or by a combination of compression and thermal drying/microwave/vacuum dewatering techniques. The dewatering step will generally be carried out until the HIPE foam is ready for use and is as dry as practicable. Frequently such compression dewatered foams will have a water (moisture) content of from about 50 to about 500%, more preferably from about 50 to about 200%, by weight on a dry weight basis. Subsequently, the compressed foams can be thermally dried to a moisture content of from about 5 to about 40%, more preferably from about 5 to about 15%, on a dry weight basis.

II. Polymeric Foams Prepared from HIPE

A. General Foam Characteristics

Polymeric foams according to the present invention useful in absorbent articles and structures are those which are relatively open-celled. This means the individual cells of the foam are in complete, unobstructed communication with adjoining cells. The cells in such substantially open-celled foam structures have intercellular openings or "windows" that are large enough to permit ready fluid transfer from one cell to the other within the foam structure.

These substantially open-celled foam structures will generally have a reticulated character with the individual cells being defined by a plurality of mutually connected, three dimensionally branched webs. The strands of polymeric material making up these branched webs can be referred to as "struts." For purposes of the present invention, a foam material is "open-celled" if at least 80% of the cells in the foam structure that are at least 1 μm size are in fluid communication with at least one adjacent cell.

In addition to being open-celled, these polymeric foams can be sufficiently hydrophilic to permit the foam to absorb aqueous body fluids in the amounts specified hereafter. The internal surfaces of the foam structures are rendered hydrophilic by residual hydrophilizing surfactants left in the foam structure after polymerization, or by selected post-polymerization foam treatment procedures, as previously described. The extent to which these polymeric foams are "hydrophilic" can be quantified by the "adhesion tension" value exhibited when in contact with an absorbable test liquid. Such a procedure is described in the TEST METHODS section of copending U.S. application Ser. No. 989,270 (Dyer et al), filed Dec. 11, 1992, which is incorporated by reference. Foams which are useful as absorbents in the present invention are generally those which exhibit an adhesion tension value of from about 15 to about 65 dynes/cm, more preferably from about 20 to about 65 dynes/cm, as determined by capillary absorption of synthetic urine having a surface tension of 65±5 dynes/cm.

The polymeric foams prepared according to the present invention can be prepared in the form of collapsed (i.e. unexpanded), polymeric foams that, upon contact with aqueous fluids, expand and absorb such fluids. These collapsed polymeric foams are usually obtained by expressing water from the resultant polymerized HIPE through compressive forces, and/or thermal drying, or vacuum dewatering. After compression, and/or thermal drying/vacuum dewatering, the polymeric foam is in a collapsed, or unexpanded state. See copending U.S. application Ser. No. 989,270 (Dyer et al), filed Dec. 11, 1992 (herein incorporated by reference) which describes the properties of these collapsed foams.

IV. Uses of Polymeric Foams

A. In General

Polymeric foams made according to the process of the present invention are broadly useful in a variety of products. For example, these foams can be employed as environmental waste oil sorbents; as absorbent components in bandages or dressings; to apply paint to various surfaces; in dust mop heads; in wet mop heads; in dispensers of fluids; in packaging; in odor/moisture sorbents; in cushions; and for many other uses.

B. Absorbent Articles

Polymeric foams made according to the process of the present invention are particularly useful as absorbent members for various absorbent articles. See U.S. Pat. No. 5,268,224 (DesMarais et al), issued Dec. 7, 1993; U.S. Pat. No. 5,147,345 (Young et al), issued Sep. 15, 1992 and copending U.S. application Ser. No. 989,270 (Dyer et al), filed Dec. 11, 1992 (herein incorporated by reference) which disclose the use of similar absorbent foams as absorbent members in absorbent articles. By "absorbent article" is meant a consumer product that is capable of absorbing significant quantities of urine or other fluids (i.e., liquids), like aqueous fecal matter (runny bowel movements), discharged by an incontinent wearer or user of the article. Examples of such absorbent articles include disposable diapers, incontinence garments, catamenials such as tampons and sanitary napkins, disposable training pants, bed pads, and the like. The absorbent foam structures herein are particularly suitable for use in articles such as diapers, incontinence pads or garments, clothing shields, and the like.

In its simplest form, such absorbent articles need only include a backing sheet, typically relatively liquid-impervious, and one or more absorbent foam structures associated with this backing sheet. The absorbent foam structure and the backing sheet will be associated in such a manner that the absorbent foam structure is situated between the backing sheet and the fluid discharge region of the wearer of the absorbent article. Liquid impervious backing sheets can comprise any material, for example polyethylene or polypropylene, having a thickness of about 1.5 mils (0.038 mm), which will help retain fluid within the absorbent article.

More conventionally, these absorbent articles will also include a liquid-pervious topsheet element that covers the side of the absorbent article that touches the skin of the wearer. In this configuration, the article includes an absorbent core comprising one or more absorbent foam structures positioned between the backing sheet and the topsheet. Liquid-pervious topsheets can comprise any material such as polyester, polyolefin, rayon and the like that is substantially porous and permits body fluid to readily pass there through and into the underlying absorbent core. The topsheet material will preferably have no propensity for holding aqueous fluids in the area of contact between the topsheet and the wearer's skin.

V. Test Methods

A. Dynamic Mechanical Analysis (DMA)

DMA is used to determine the Tgs of polymers including polymeric foams. Samples of the foams are sliced into blocks 3–5 mm in thickness and washed 3–4 times in distilled water, expressing the fluid through roller nips between each washing. The resulting foam blocks are allowed to dry in air. The dried foam slices are cored to yield a cylinders 25 mm in diameter. These cylinders are analyzed using a Rheometrics RSA-II dynamic mechanical analyzer set in compression mode using parallel plates 25 mm in diameter. Instrument parameters used were as follows:

Temperature step from ca. 85° C. to −40° C. in steps of 2.5° C.

Soak intervals between temperature changes of 125–160 seconds

Dynamic strain set at 0.1% to 1.0% (usually 0.7%)

Frequency set at 1.0 radians/second

Autotension set in static force tracking dynamic force mode with initial static force set at 5 g.

The glass transition temperature is taken as the maximum point of the loss tangent versus temperature curve.

VI. Specific Examples

These examples illustrate the preparation of collapsed high ratio HIPE foams falling within the scope of the present invention.

EXAMPLE 1

Preparation of Foam from a HIPE

A) Emulsifier Preparation

The cocoyl diglycerol ether emulsifier is prepared as follows: Approximately 34 parts of sodium methoxide (25% by weight in methanol) and approximately 4700 parts anhydrous glycerol are reacted together at 130° C. under a nitrogen atmosphere for about 3 hours. After the product is heated to about 185° C., approximately 4100 parts of distilled cocoyl glycidyl ether, having a $C_{12}$:$C_{14}$:$C_{16}$ ratio of about 65:28:6 (Epoxide No. 8; Procter and Gamble Co.) is added dropwise over a period of about 30 minutes. The resulting mixture is reacted with stirring for a total of about 3 hours at 190° C. After cooling to room temperature, the reaction product is reheated to about 70° C., a fraction rich in glycerol/diglycerol settles to the bottom and is removed, and the top layer is collected. Two batches of the top layer are combined and a volatile fraction is removed by distillation at about 190° C. and about 2 mm Hg, yielding the cocoyl diglycerol ether emulsifier. The product is analyzed by gel permeation chromatography and found to be about 60% diglycerol monoaliphatic ether, about 30% triglycerol dialiphatic ether, and about 10% higher polyglycerol polyaliphatic ethers. The product has a minimum interfacial tension of about 0.9 dyne/cm.

B) Emulsion Preparation

Anhydrous calcium chloride (36.32 kg) and potassium persulfate (567 g) are dissolved in 378 liters of water. This provides the water phase stream to be used in a continuous process for forming a HIPE emulsion.

To a monomer combination comprising styrene (1600 g), divinylbenzene 55% technical grade (1600 g.), 2-ethylhexylacrylate (4800 g), is added the cocoyl diglycerol ether emulsifier (480 g).

After mixing, this combination of materials is allowed to settle overnight. The supernatant is withdrawn and used as the oil phase in a continuous process for forming a HIPE emulsion. (About 40 g of a sticky residue is discarded.)

At an aqueous phase temperature of 47°–49° C. and an oil phase temperature of 15° C., separate streams of the oil phase and water phase are fed to a dynamic mixing apparatus. Thorough mixing of the combined streams in the dynamic mixing apparatus is achieved by means of a pin impeller. At this scale of operation, an appropriate pin impeller comprises a cylindrical shaft of about 21.6 cm in length with a diameter of about 1.9 cm. The shaft holds 4 rows of pins, 2 rows having 17 pins and 2 rows having 16 pins, each having a diameter of 0.5 cm extending outwardly from the central axis of the shaft to a length of 1.6 cm. The pin impeller is mounted in a cylindrical sleeve which forms the dynamic mixing apparatus, and the pins have a clearance of 0.8 mm from the walls of the cylindrical sleeve.

A spiral static mixer is mounted downstream from the dynamic mixing apparatus to provide back pressure in the dynamic mixer and to provide improved incorporation of components into the emulsion that is eventually formed. Such a static mixer is 14 inches (35.6 cm) long with a 0.5 inch (1.3 cm) outside diameter. The static mixer is a TAH Industries Model 070-821, modified by cutting off 2.4 inches (6.1 cm).

The combined mixing apparatus set-up is filled with oil phase and water phase at a ratio of 2 parts water to 1 part oil. The dynamic mixing apparatus is vented to allow air to escape while filling the apparatus completely. The flow rates during filling are 2.27 g/sec oil phase and 4.54 cc/sec water phase.

Once the apparatus set-up is filled, agitation is begun in the dynamic mixer, with the impeller turning at 1200 RPM. The flow rate of the water phase is then steadily increased to a rate of 37 co/sec and the oil phase flow rate is reduced to 1.29 g/sec over a time period of about 1 min. The back pressure created by the dynamic and static mixers at this point is 5.7 psi (39 kPa). The impeller speed is then steadily decreased to a speed of 1000 RPM over a period of 40 sec. The back pressure drops to 3.9 psi (27 kPa). At this point, the impeller speed is instantly increased to 1200 RPM. The system back pressure increases to 4.9 psi (34 kPa) and remains constant thereafter.

C) Polymerization of the Emulsion

The formed emulsion flowing from the static mixer at this point is collected in a round polypropylene tub, 17 in. (43 cm) in diameter and 7.5 in. (10 cm) high, with a concentric insert made of Celcon plastic. The insert is 5 in. (12.7 cm) in diameter at its base and 4.75 in. (12 cm) in diameter at its top and is 6.75 in. (17.1 cm) high. The emulsion-containing tubs are kept in a room maintained at 65° C. for 18 hours to bring about polymerization of the emulsion in the containers to thereby form polymeric foam.

D) Foam Washing and Dewatering

After curing is complete, the wet cured foam is removed from the curing tubs. The foam at this point contains about 25–30 times the weight of polymerized material (25–30×) of the residual water phase containing dissolved emulsifiers, electrolyte, initiator residues, and initiator. The foam is sliced with a sharp reciprocating saw blade into sheets which are 0.145 inches (0.368 cm) in thickness. These sheets are then subjected to compression in a series of 2 porous nip rolls equipped with vacuum which gradually reduce the residual water phase content of the foam to about 6 times (6×) the weight of the polymerized material. At this point, the sheets are then resaturated with a 1% $CaCl_2$ solution at 60° C., are squeezed in a series of 2 porous nip rolls equipped with vacuum to a water phase content of about 5%. The $CaCl_2$ content of the foam is between 4 and 6%.

The foam remains compressed after the final nip at a thickness of about 0.028 in. (0.071 cm). The foam is then dried in air for about 16 hours. Such drying reduces the moisture content to about 8–17% by weight of polymerized material.

EXAMPLE 2

Preparation of Foam from a HIPE

A) Emulsifier Preparation

The 2-octyldodecyl diglycerol ether emulsifier is prepared as follows. 2-Octyldodecyl glycidyl ether is prepared using the aliphatic glycidyl ether method described above. Approximately 360 g of epichlorohydrin is added to a stirred mixture of about 1.5 kg of 2-octyldodecanol (Jarcol I-20; Jarchem Industries) and about 10 g of stannic chloride. After the resulting exotherm heats the reaction mixture to about 70° C., the mixture is stirred under nitrogen for an additional about 6 hours at about 65° C. About 190 g of sodium hydroxide prediluted in approximately 280 g of distilled water is then added and reacted for about 6 hours at about 65° C. After separating the aqueous layer, the organic layer is water washed three times, heated to about 95° C., sparged with nitrogen to dry, and distilled in the range of about 185°–210° C. and <1 mm Hg to yield approximately 1.1 kg of 2-octyldodecyl glycidyl ether. Approximately 8.1 g of sodium methoxide (25% by weight in methanol) and approximately 1400 g of anhydrous glycerine are reacted together for about 3 hours under nitrogen at about 130° C. After heating the resulting mixture to about 185° C., the 2-octyldodecyl glycidyl ether is added dropwise over a period of about 2 hours. The resultant mixture is stirred for about 4 hours at about 185° C. under nitrogen and then allowed to cool without mixing. A glycerine layer settles to the bottom and is removed by siphoning. Volatiles are distilled from the remaining material by heating to about 150° C. at about 2 mm Hg, yielding approximately 1.3 kg of product. Approximately 700 g of the product is dissolved into an excess of mixed hexanes. This hexane phase is multiply extracted with 90:10 (v:v) methanol:water. The methanol:water extracts are combined and the solvent is removed using a rotary evaporator. The resulting residue is heated to about 70° C. and filtered through a glass microfiber filter, yielding approximately 380 g of 2-octyldodecyl diglycerol ether emulsifier. The product is analyzed by gel permeation chromatography and found to be about 82% diglycerol monoaliphatic ether and about 5% triglycerol dialiphatic ether. The product has a minimum interfacial tension of about 4.8 dyne/cm B) Emulsion Preparation Anhydrous calcium chloride (36.32 kg) and potassium persulfate (189 g) are dissolved in 378 L of water. This provides the water phase stream to be used in a continuous process for forming a HIPE emulsion.

To a monomer combination comprising styrene (360 g) technical grade divinylbenzene (420 g), 2-ethylhexylacrylate (1860 g), and butanediol dimethacrylate (360 g) is added a 2-octyldodecyl diglycerol ether emulsifier (180 g).

At an aqueous phase temperature of 48°–50° C. and an oil phase temperature of 25° C., separate streams of the oil phase and water phase are fed to a dynamic mixing apparatus. Thorough mixing of the combined streams in the dynamic mixing apparatus is achieved by means of a pin impeller. At this scale of operation, an appropriate pin impeller comprises a cylindrical shaft of about 21.6 cm in length with a diameter of about 1.9 cm. The shaft holds 4 rows of pins, 2 rows having 17 pins and 2 rows having 16 pins, each having a diameter of 0.5 cm extending outwardly from the central axis of the shaft to a length of 1.6 cm. The pin impeller is mounted in a cylindrical sleeve which forms the dynamic mixing apparatus, and the pins have a clearance of 0.8 mm from the walls of the cylindrical sleeve.

A spiral static mixer is mounted downstream from the dynamic mixing apparatus to provide back pressure in the dynamic mixer and to provide improved incorporation of components into the emulsion that is eventually formed. Such a static mixer is 14 inches (35.6 cm) long with a 0.5 inch (1.3 cm) outside diameter. The static mixer is a TAH Industries Model 070-821, modified by cutting off 2.4 inches (6.1 cm).

The combined mixing apparatus set-up is filled with oil phase and water phase at a ratio of 2 parts water to 1 part oil. The dynamic mixing apparatus is vented to allow air to escape while filling the apparatus completely. The flow rates during filling are 3.78 g/sec oil phase and 7.56 cc/sec water phase.

Once the apparatus set-up is filled, agitation is begun in the dynamic mixer, with the impeller turning at 1800 RPM. The flow rate of the water phase is then steadily increased to a rate of 38 cc/sec over a time period of abut 1 minute and the oil phase flow rate is reduced to 0.83 g/sec over a time period of about 4 minutes. The back pressure created by the dynamic and static mixers at this point is 3.9 psi (27 kPa).

C) Polymerization of the Emulsion

The formed emulsion flowing from the static mixer at this point is collected in a round polypropylene tub, 17 in. (43 cm) in diameter and 7.5 in (10 cm) high, with a concentric insert made of Celcon plastic. The insert is 5 in (12.7 cm) in diameter at its base and 4.75 in (12 cm) in diameter at its top and is 6.75 in (17.1 cm) high. The emulsion-containing tubs are kept in a room maintained at 65° C. for 18 hours to bring about polymerization of the emulsion in the containers to thereby form polymeric foam.

D) Foam Washing and Dewatering

After curing is complete, the wet cured foam is removed from the curing tubs. The foam at this point has residual water phase (containing dissolved emulsifiers, electrolyte, initiator residues, and initiator) about 40–50 times (40–50×) the weight of the polymerized monomers. The foam is sliced with a sharp reciprocating saw blade into sheets which are 0.075 inches (0.191 cm) in thickness. These sheets are then subjected to compression in a series of 2 porous nip rolls equipped with vacuum which gradually reduce the residual water phase content of the foam to about 3 times (3×) the weight of the polymerized material. At this point, the sheets are then resaturated with a 1.5% CaCl$_2$ solution at 60° C., are squeezed in a series of 3 porous nip rolls equipped with vacuum to a water phase content of about 2×. The CaCl$_2$ content of the foam is between 3 and 8%.

The foam is then dried in air for about 16 hours. Such drying reduces the moisture content to about 4–10% by weight of polymerized material.

What is claimed is:

1. A process for the preparation of an high internal phase emulsion, which comprises the step of forming a water-in-oil emulsion from:

A) an oil phase comprising:
    1) from about 65 to about 98% by weight of a monomer component capable of forming a polymer having a Tg of about 35° C. or lower and comprising:
      a) from about 30 to about 85% by weight of at least one substantially water-insoluble monofunctional monomer capable of forming an atactic amorphous polymer having a Tg of about 25° C. or lower;
      b) from 0 to about 40% by weight of at least one substantially water-insoluble monofunctional comonomer; and
      c) from about 5 to about 40% by weight of at least one substantially water-insoluble, polyfunctional crosslinking agent; and
    2) from about 2 to about 35% by weight of an emulsifier component which is soluble in the oil phase and which is suitable for forming a stable water-in-oil emulsion, said emulsifier component comprising at least about 40% linear diglycerol monoaliphatic ethers and at least about 60% polyglycerol aliphatic ethers having C$_{10}$–C$_{24}$ aliphatic groups; and
  B) a water phase comprising an aqueous solution containing:
    1) from about 0.2 to about 20% by weight of a water-soluble electrolyte; and
    2) an effective amount of a polymerization initiator;
  C) a volume to weight ratio of the water phase to the oil phase in the range of from about 12:1 to about 125:1.

2. The process of claim 1 wherein the ratio of the water phase to the oil phase is in the range of from about 20:1 to about 90:1.

3. The process of claim 2 wherein the ratio of the water phase to the oil phase is in the range of from about 25:1 to about 75:1.

4. The process of claim 2 wherein the oil phase comprises from about 80 to about 97% by weight monomer component and from about 3 to about 20% by weight emulsifier component.

5. The process of claim 4 wherein the oil phase comprises from about 90 to about 97% by weight monomer component and from about 3 to about 10% by weight emulsifier component.

6. The process of claim 4 wherein the monomer component comprises:
  a) from about 50 to about 70% by weight of a monomer selected from the group consisting of butyl acrylate, hexyl acrylate, octyl acrylate, 2-ethylhexyl acrylate, nonyl acrylate, decyl acrylate, dodecyl acrylate, isodecyl acrylate, tetradecyl acrylate, benzyl acrylate, nonylphenyl acrylate, hexyl methacrylate, octyl methacrylate, nonyl methacrylate, decyl methacrylate, isodecyl methacrylate, dodecyl methacrylate, tetradecyl methacrylate, N-octadecyl acrylamide, p-n-octylstyrene, isoprene, 1,3-butadiene, 1,3-hexadiene, 1,3-heptadiene, 1,3-octadiene, 1,3-nonadiene, 1,3-decadiene, 1,3-undecadiene, 1,3-dodecadiene, 2-methyl-1,3-hexadiene, 6-methyl-1,3-heptadiene, 7-methyl-1,3-octadiene, 1,3,7-octatriene, 1,3,9-decatriene, 1,3,6-octatriene, 2,3-dimethyl-1,3-butadiene, 2-amyl-1,3-butadiene, 2-methyl-1,3-pentadiene, 2,3-dimethyl-1,3-pentadiene, 2-methyl-3-ethyl-1,3-pentadiene, 2-methyl-3-propyl-1,3-pentadiene, 2,6-dimethyl-1,3,7-octatriene, 2,7-dimethyl-1,3,7-octatriene, 2,6-dimethyl-1,3,6-octatriene, 2,7-dimethyl-1,3,6-octatriene, 7-methyl-3-methylene-1,6-octadiene, 2,6-dimethyl-1,5,7-octatriene, 1-methyl-2-vinyl-4,6-hepta-dieny-3,8-nonadienoate, 5-methyl-1,3,6-heptatriene, 2-ethylbutadiene, and mixtures thereof;
  b) from about 5 to about 40% by weight of a comonomer selected from the group consisting of styrene, ethyl styrene, methyl methacrylate, and mixtures thereof; and
  c) from about 10 to about 30% by weight of a crosslinking agent selected from the group consisting of divinylbenzenes, divinyltoluenes, divinylxylenes, divinylnaphthalenes divinylalkylbenzenes, divinylphenanthrenes, trivinylbenzenes, divinylbiphenyls, divinyldiphenylmethanes, divinylbenzyls, divinylphenylethers, divinyldiphenylsulfides, divinylfurans, divinylsulfone, divinylsulfide, divinyldimethylsilane, 1,1'-divinylferrocene, 2-vinylbutadiene, ethylene glycol dimethacrylate, neopentyl glycol dimethacrylate, 1,3-butanediol dimethacrylate, diethylene glycol dimethacrylate, hydroquinone dimethacrylate, catechol dimethacrylate, resorcinol dimethacrylate, triethylene glycol dimethacrylate, polyethylene glycol dimethacrylate, trimethylolpropane trimethacrylate, pentaerythritol tetramethacrylate, 1,4-butanediol dimethacrylate, 1,6-hexanediol diacrylate, 1,4-butanediol diacrylate, tetramethylene diacrylate, trimethyolpropane triacrylate, pentaerythritol tetraacrylate, N-methylolacrylamide, N-methylolmethacrylamide, 1,2-ethylene bisacrylamide, 1,4-butane bisacrylamide, and mixtures thereof.

7. The process of claim 6 wherein the monomer component comprises:
  a) from about 50 to about 70% by weight of a monomer selected from the group consisting of isodecyl acrylate, n-dodecyl acrylate and 2-ethylhexyl acrylate, and mixtures thereof;
  b) from about 15 to about 30% by weight of the comonomer selected from the group consisting of styrene, ethyl styrene and mixtures thereof; and
  c) from about 15 to about 25% by weight of a crosslinking agent selected from the group consisting of divinyl benzene, ethylene glycol dimethacrylate, diethylene glycol dimethacrylate, 1,6-hexanediol diacrylate, 2-butenediol dimethacrylate, ethylene glycol diacrylate, trimethylolpropane triacrylate and trimethacrylate, and mixtures thereof.

8. The process of claim 2 wherein the polyglycerol aliphatic ethers comprise from about 40 to about 90% linear diglycerol monoaliphatic ethers; and from about 10 to about 60% other polyglycerol ethers.

9. The process of claim 8 wherein the polyglycerol aliphatic ethers comprise at least about 70% linear diglycerol monoaliphatic ethers.

10. The process of claim 8 wherein the polyglycerol aliphatic ethers comprise from about 60 to about 95% polyglycerol aliphatic ethers having $C_{10}$–$C_{24}$ aliphatic groups.

11. The process of claim 10 wherein the $C_{10}$–$C_{24}$ aliphatic groups are selected from the group consisting of $C_{12}$–$C_{14}$ linear saturated aliphatic groups, $C_{16}$–$C_{24}$ branched saturated chain aliphatic groups, $C_{16}$–$C_{22}$ linear unsaturated aliphatic groups, and mixtures thereof.

12. The process of claim 11 wherein the $C_{10}$–$C_{24}$ aliphatic groups are selected from the group consisting of lauryl, myristyl, isostearyl, 2-octyldodecyl, 2-decyltetradecyl, oleyl, and mixtures thereof.

13. A process for the preparation of a polymeric foam material, which comprises the steps of:
  I) forming a water-in-oil emulsion from:
   A) an oil phase comprising:
    1) from about 65 to about 98% by weight of a monomer component capable of forming a polymer having a Tg of about 35° C. or lower and comprising:
      a) from about 30 to about 85% by weight of at least one substantially water-insoluble monomer having at least one substantially water-insoluble monofunctional monomer capable of forming an atactic amorphous polymer having a Tg of about 25° C. or lower;
      b) from 0 to about 40% by weight of at least one substantially water-insoluble monofunctional comonomer; and
      c) from about 5 to about 40% by weight of at least one substantially water-insoluble, polyfunctional crosslinking agent; and
    2) from about 2 to about 35% by weight of an emulsifier component which is soluble in the oil phase and which is suitable for forming a stable water-in-oil emulsion, said emulsifier component comprising at least about 40% linear diglycerol monoaliphatic ethers and at least about 60% polyglycerol aliphatic ethers having $C_{10}$–$C_{24}$ aliphatic groups; and
   B) a water phase comprising an aqueous solution containing:
    1) from about 0.2 to about 20% by weight of a water-soluble electrolyte; and
    2) an effective amount of a polymerization initiator;
   C) a volume to weight ratio of the water phase to the oil phase in the range of from about 12:1 to about 125:1;
  II) polymerizing the monomer component in the oil phase of the water-in-oil emulsion to form a polymeric foam material.

14. The process of claim 13 comprising the further step of dewatering the polymeric foam material of step II) to an extent such that a collapsed, polymeric foam material is formed that will re-expand upon contact with aqueous fluids.

15. The process of claim 13 wherein the ratio of the water phase to the oil phase is in the range of from about 20:1 to about 90:1.

16. The process of claim 15 wherein the ratio of the water phase to the oil phase is in the range of from about 25:1 to about 75:1.

17. The process of claim 15 wherein the oil phase comprises from about 80 to about 97% by weight monomer component and from about 3 to about 20% by weight emulsifier component.

18. The process of claim 17 wherein the oil phase comprises from about 90 to about 97% by weight monomer component and from about 3 to about 10% by weight emulsifier component.

19. The process of claim 17 wherein the monomer component comprises:
  a) from about 50 to about 70% by weight of a monomer selected from the group consisting of butyl acrylate, hexyl acrylate, octyl acrylate, 2-ethylhexyl acrylate, nonyl acrylate, decyl acrylate, dodecyl acrylate, isodecyl acrylate tetradecyl acrylate, benzyl acrylate, nonylphenyl acrylate, hexyl methacrylate, octyl methacrylate, nonyl methacrylate, decyl methacrylate, isodecyl methacrylate, dodecyl methacrylate, tetradecyl methacrylate, N-octadecyl acrylamide, p-n-octylstyrene, isoprene, 1,3-butadiene, 1,3-hexadiene, 1,3-heptadiene, 1,3-octadiene, 1,3-nonadiene, 1,3-decadiene, 1,3-undecadiene, 1,3-dodecadiene, 2-methyl-1,3-hexadiene, 6-methyl-1,3-heptadiene, 7-methyl-1,3-octadiene, 1,3,7-octatriene, 1,3,9-decatriene, 1,3,6-octatriene, 2,3-dimethyl-1,3-butadiene, 2-amyl-1,3-butadiene, 2,6-dimethyl-1,3,7-octatriene, 2,7-dimethyl-1,3,7-octatriene, 2,6-dimethyl-1,3,6-octatriene, 2,7-dimethyl-1,3,6-octatriene, 7-methyl-3-methylene-1,6-octadiene, 2,6-dimethyl-1,5,7-octatriene, 1-methyl-2-vinyl-4,6-hepta-dieny-3,8-nonadienoate, 5-methyl-1,3,6-heptatriene, 2-ethylbutadiene, and mixtures thereof;
  b) from about 5 to about 40% by weight of comonomer selected from the group consisting of styrene, ethyl styrene, methyl methacrylate, and mixtures thereof, and
  c) from about 10 to about 30% by weight of a crosslinking agent selected from the group consisting of divinylbenzenes, divinyltoluenes, divinylxylenes, divinylnaphthalenes divinylalkylbenzenes, divinylphenanthrenes, trivinylbenzenes, divinylbiphenyls, divinyldiphenylmethanes, divinylbenzyls, divinylphenylethers, divinyldiphenylsulfides, divinylfurans, divinylsulfone, divinylsulfide, divinyldimethylsilane, 1,1'-divinylferrocene, 2-vinylbutadiene, ethylene glycol dimethacrylate, neopentyl glycol dimethacrylate, 1,3-butanediol dimethacrylate, diethylene glycol dimethacrylate, hydroquinone dimethacrylate, catechol dimethacrylate, resorcinol dimethacrylate, triethylene glycol dimethacrylate, polyethylene glycol dimethacrylate, trimethylolpropane trimethacrylate, pentaerythritol tetramethacrylate, 1,4-butanediol dimethacrylate, 1,6-hexanediol diacrylate, 1,4-butanediol diacrylate, tetramethylene diacrylate, trimethyolpropane triacrylate, pentaerythritol tetraacrylate, N-methylolacrylamide, N-methylolmethacrylamide, 1,2-ethylene bisacrylamide, 1,4-butane bisacrylamide, and mixtures thereof.

20. The process of claim 19 wherein the monomer component comprises:
  a) from about 50 to about 70% by weight of a monomer selected from the group consisting of isodecyl acrylate, n-dodecyl acrylate and 2-ethylhexyl acrylate, and mixtures thereof;
  b) from about 15 to about 30% by weight of comonomer selected from the group consisting of styrene, ethyl styrene, and mixtures thereof; and
  c) from about 15 to about 25% by weight of a crosslinking agent selected from the group consisting of divinyl benzene, ethylene glycol dimethacrylate, diethylene glycol dimethacrylate, 1,6-hexanediol diacrylate, 2-butenediol dimethacrylate, ethylene glycol diacrylate, trimethylolpropane triacrylate and trimethacrylate, and mixtures thereof.

21. The process of claim 15 wherein the polyglycerol aliphatic ethers comprise from about 40 to about 90% linear diglycerol monoaliphatic ethers; and from about 10 to about 60% other polyglycerol ethers.

22. The process of claim 21 wherein the polyglycerol aliphatic ethers comprise at least about 70% linear diglycerol monoaliphatic ethers.

23. The process of claim 21 wherein the polyglycerol aliphatic ethers comprise from about 60 to about 95% polyglycerol aliphatic ethers having $C_{10}$–$C_{24}$ aliphatic groups.

24. The process of claim 23 wherein the $C_{10}$–$C_{24}$ aliphatic groups are selected from the group consisting of $C_{12-C14}$ linear saturated aliphatic groups, $C_{16}$–$C_{24}$ branched saturated chain aliphatic groups, $C_{16}$–$C_{22}$ linear unsaturated aliphatic groups, and mixtures thereof.

25. The process of claim 24 wherein the $C_{10}$–$C_{24}$ aliphatic groups are selected from the group consisting of lauryl, myristyl, isostearyl, 2-octyldodecyl, 2-decyltetradecyl, oleyl, and mixtures thereof.

* * * * *